(12) United States Patent
Kim et al.

(10) Patent No.: US 9,223,620 B2
(45) Date of Patent: Dec. 29, 2015

(54) APPARATUS AND METHOD FOR PROCESSING DATA

(75) Inventors: Jong-Tae Kim, Seoul (KR); Hyun-Ki Baik, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 12/987,482

(22) Filed: Jan. 10, 2011

(65) Prior Publication Data

US 2011/0191782 A1 Aug. 4, 2011

(30) Foreign Application Priority Data

Feb. 1, 2010 (KR) ........................ 10-2010-0009283

(51) Int. Cl.
*G06F 9/48* (2006.01)
*G06F 9/50* (2006.01)

(52) U.S. Cl.
CPC ................ *G06F 9/50* (2013.01); *G06F 9/4893* (2013.01); *G06F 2209/5019* (2013.01)

(58) Field of Classification Search
None
See application file for complete search history.

(56) References Cited

U.S. PATENT DOCUMENTS

| | | | | |
|---|---|---|---|---|
| 5,978,509 | A * | 11/1999 | Nachtergaele et al. | 382/236 |
| 6,931,061 | B2 | 8/2005 | Youn et al. | |
| 6,986,137 | B1 * | 1/2006 | King et al. | 718/104 |
| 7,398,528 | B2 | 7/2008 | Khawand et al. | |
| 8,250,581 | B1 * | 8/2012 | Blanding | 718/104 |
| 2006/0126728 | A1 | 6/2006 | Yu et al. | |
| 2008/0107184 | A1 | 5/2008 | Katsavounidis et al. | |
| 2008/0225950 | A1 | 9/2008 | Zhu | |
| 2008/0244588 | A1 * | 10/2008 | Leiserson et al. | 718/102 |
| 2009/0003447 | A1 | 1/2009 | Christoffersen et al. | |
| 2009/0052542 | A1 | 2/2009 | Romanovskiy et al. | |
| 2009/0125538 | A1 | 5/2009 | Rosenzweig et al. | |
| 2009/0154572 | A1 | 6/2009 | Baik et al. | |
| 2010/0166081 | A1 | 7/2010 | Onoye et al. | |

FOREIGN PATENT DOCUMENTS

| | | |
|---|---|---|
| JP | 2008-118616 | 5/2008 |
| JP | 2009-044537 | 2/2009 |
| KR | 10-2005-0086623 | 8/2005 |
| KR | 10-2006-0071293 | 6/2006 |
| KR | 10-2007-0064669 | 6/2007 |
| KR | 10-0772502 B1 | 11/2007 |
| KR | 10-2007-0120937 | 12/2007 |

(Continued)

OTHER PUBLICATIONS

Mesa et al. Scalability of Macroblock-level Parallelism for H.264 Decoding. [online] (Dec. 11, 2009). IEEE, pp. 236-243. Retrieved From the Internet <http://upcommons.upc.edu/e-prints/bitstream/2117/8070/1/performance_2dwave_ieee.pdf>.*

(Continued)

*Primary Examiner* — Emerson Puente
*Assistant Examiner* — Jonathan R Labud
(74) *Attorney, Agent, or Firm* — NSIP Law

(57) ABSTRACT

A data processing apparatus and method for allocating data to processors, allowing the processors to process the data efficiently. The data processing apparatus may predict a result of processing data, based on a workload for the data, according to a number of processors, and may determine the number of processors to be allocated with the data, using the predicted processing result.

18 Claims, 4 Drawing Sheets

(56) References Cited

FOREIGN PATENT DOCUMENTS

| KR | 10-2009-0020460 | 2/2009 |
| KR | 10-2009-0065398 | 6/2009 |

OTHER PUBLICATIONS

Huang et al. A workload prediction model for decoding mpeg video and its application to workload-scalable transcoding. [online] (Sep. 28, 2007). ACM, pp. 1-10. Retrieved From the Internet <http://www.comp.nus.edu.sg/~wangye/papers/4.Perception-Aware_Low-Power_Media_Processing_for_Portable_Devices/2007_A_Workload_Prediction_Model_for_Decodin>.*

Kadayif et al. An Integer Linear Programming Based Approach for Parallelizing Applications in On-Chip Multiprocessors. [online] (2002). ACM, pp. 1-6. Retrieved From the Internet <http://dent.cecs.uci.edu/~papers/compendium94-03/papers/2002/dac02/pdffiles/45_3.pdf>.*

\* cited by examiner

APPARATUS AND METHOD FOR PROCESSING DATA

CROSS-REFERENCE TO RELATED APPLICATION(S)

This application claims the benefit under 35 U.S.C. §119 (a) of Korean Patent Application No. 10-2010-0009283, filed on Feb. 1, 2010, in the Korean Intellectual Property Office, the entire disclosure of which is incorporated herein by reference for all purposes.

BACKGROUND

1. Field

The following description relates to a data allocation technique allowing a processor to process data efficiently.

2. Description of the Related Art

With the recent development of data processing technology, types of large data such as text and images have become more diverse. Processing such large data amounts is complicated and takes a great amount of time. Accordingly, the workload to be processed by the processor is gradually increasing. To process a large amount of data in a short period of time, hardware capability of a processor has been increased or software for operating the processor more efficiently has been developed. For example, data may be processed in parallel using a plurality of processors. Since a plurality of processors process individual data in a distributed manner, it takes a shorter period of time to process the data, compared with when the data is processed sequentially by a single processor.

Hence, since process procedures have recently become more complicated and data processing time has increased, studies on efficient data processing methods have been carried out. However, user demand requires ever faster processing.

SUMMARY

In one general aspect, there is provided a data processing apparatus, including: a processor configured to process data, a prediction unit configured to: predict a workload for processing data, and predict a result of processing data, based on the workload, according to a number of processors configured to process the data, and a determination unit configured to determine the number of processors to be allocated with the data, using the predicted processing result.

In the data processing apparatus, the prediction unit may be further configured to predict the workload for processing the data, based on data property information included in a header of the data.

In the data processing apparatus, the prediction unit may be further configured to predict the processing result, based on at least one of: a processing time and an amount of power consumption.

In the data processing apparatus, the determination unit may be further configured to: is preliminarily determine a number of preliminary processors, using the processing time of the predicted processing result, and determine a final number of processors, among the number of preliminary processors, using the amount of power consumption.

In the data processing apparatus, the determination unit may be further configured to determine the number of processors by comparing: the predicted processing result, and a user requirement.

The data processing apparatus may further include an allocation unit configured to allocate the data to the determined number of processors, such that the processors are further configured to process the data in parallel.

In the data processing apparatus, the data property information, which may be included in the header of the data, may include at least one of: data storage format, data processing scheme, and data type.

In the data processing apparatus: the data property information may include at least one of: macroblock size, sub-macroblock size, and the unit of motion estimation, and the prediction unit may be further configured to predict the workload for processing the data based on at least one of: the macroblock size, the sub-macroblock size, and the unit of motion estimation.

In another general aspect, there is provided a data processing method using at least one processor, the data processing method including: predicting a workload for processing data, predicting a result of processing data, based on the predicted workload, according to a number of processors for processing the data, and determining the number of processors to be allocated with the data, using the predicted processing result.

In the data processing method, the predicting of the processing result may include is predicting the processing result, based on at least one of: a processing time and an amount of power consumption.

In the data processing method, the determining of the number of processors may include: preliminarily determining a number of preliminary processors, using the processing time of the predicted processing result, and determining the final number of processors, among the number of preliminary processors, using the amount of power consumption.

In the data processing method, the determining of the number of processors may include determining the number of processors by comparing: the predicted processing result, and a user requirement.

The data processing method may further include allocating the data to the determined number of processors, such that the processors process the data in parallel.

The data processing method may further include predicting the workload for processing the data, based on data property information included in a header of the data.

In the data processing method, the data property information, which may be included in a header of the data, may include at least one of: data storage format, data processing scheme, and data type.

In the data processing method, the data property information may include at least one of: macroblock size, sub-macroblock size, and the unit of motion estimation, and the method may further include predicting the workload for processing the data based on at least one of: the macroblock size, the sub-macroblock size, and the unit of motion estimation.

In another general aspect, there is provided a computer-readable information storage medium storing a program for a data processing method using at least one processor, including: predicting a workload for processing data, predicting a result of processing data, based on the predicted workload, according to a number of processors for processing the data, and determining the number of processors to be allocated with the data, using the predicted is processing result.

Other features and aspects may be apparent from the following detailed description, the drawings, and the claims.

Figure 1:
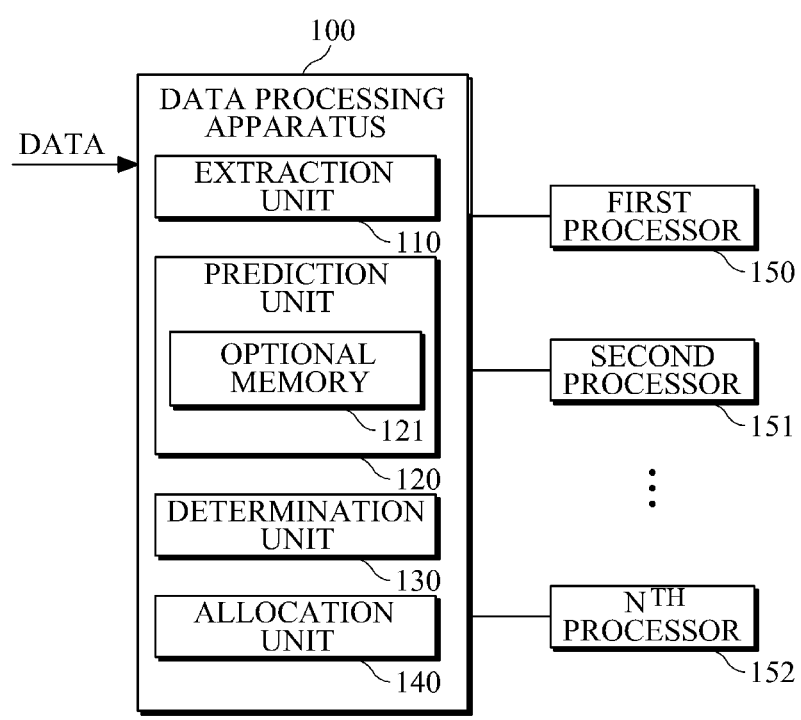
FIG. 1 is a diagram illustrating an example of a data processing apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of a data processing apparatus. Referring to the example is illustrated in FIG. 1, the data processing apparatus 100 may include an extraction unit 110, a prediction unit 120, a determination unit 130, and an allocation unit 140. Alternatively, the data processing apparatus 100 may further include at least one or more processors 150, 151, and 152.

The extraction unit 110 may extract data property information from input data. For example, the extraction unit 110 may extract header information from input data to obtain data property information.

The data property information may be data storage format information, data processing scheme information, data type information, and the like. For example, the data storage format information may indicate a program to be used for storing data among, e.g., Microsoft Word®, Microsoft Excel®, Microsoft PowerPoint®, and Adobe Acrobat® programs. It should be understood that other programs may be used. All trademarks are the property of their respective owners.

For example, the data processing scheme information may indicate an encoding or decoding scheme with respect to video data. Alternatively, in an example of data conversion, the data processing scheme information may indicate a method of conversion, a program to be used, and a target format.

For example, the data type information may indicate whether the data is text data, image data, command for input/output control, or an application programmed to achieve a given purpose.

However, the data storage format information, data processing scheme information, and data type information are only examples, and the data property information may be any information that can be used as criteria for predicting a workload to be processed by a processor.

The prediction unit 120 may predict the amount of data to be processed by the processor based on the data property information included in header of the data. That is, the amount of is data may vary according to the data property information. For example, an optional memory 121 may store a table showing a workload corresponding to each data property information or a unit workload. The table may be defined by a user, or may be updated according to a workload predicted by the data processing apparatus 100. In the table, the unit workload may be defined according to a data type, a data size, a data storage format, and a data processing scheme. For example, to process text data of 1 kbyte, the unit workload may be defined as "10", and to process image data of 1 Mbyte, the unit workload may be defined as "100".

An example of a method of predicting a workload based on the table described above will be described. The prediction unit 120 may predict a workload based on the unit workload. For example, if the extracted data property information indicates that the input data is 3 kbyte text data, the prediction unit 120 may multiply a unit workload (1 kbyte text data) by three (3) to obtain a final workload. That is, the final workload may be obtained as "30".

Although in the above example, the workload is implemented as a table according to data property information, the workload may be implemented using various methods.

The prediction unit 120 may predict a result of processing data based on the predicted workload for the data according to the number of processors. The processing result may be predicted based on processing time, and the amount of power consumption. For example, if the processing result is predicted based on the processing time and a workload for data is "100", the prediction unit 120 may predict the time consumed for processing data corresponding to the workload of "100" according to the number of processors. That is, the prediction unit 120 may predict that it takes 10 seconds for a single processor to process the data, 5 seconds for two processors, 3 second for three processors, and 2.5 seconds for four processors to process the same data.

The determination unit 130 may determine the number of processors to be allocated with is the data using the predicted processing result. For example, if the processing result is predicted based on the processing time, and the user sets the processing time to be minimum, the determination unit 130 may determine the number of processors such that the predicted processing time can be minimum.

The determination unit 130 may compare the processing result and a user requirement to determine the number of processors. For example, the prediction unit 120 may predict that one processor may takes 50 seconds (processing time) to process a workload of "100", two processors may take 25 seconds to process the same workload and three processors may take 16 seconds to process the same workload. If the user requirement is to process the data within 30 seconds, the determination unit 130 may determine the number of processors to be allocated with the data as two or three.

In addition, the determination unit 130 may preliminarily determine the number of preliminary processors using the processing time included in the processing result, and may finally determine the number of final processors from the preliminary processors based on the amount of power consumption. For example, in the above example, the amount of power consumption included in the processing result may be used to determine the number of processors between two or three.

For example, the prediction unit 120 may predict that a single processor takes 50 seconds (processing time) to process a workload of "100", two processors may take 24 seconds to process the same workload, and three processors may take 17 seconds to process the same workload. If the user requirement is to process the data within 30 seconds, the determination unit 130 may preliminarily determine the number of preliminary processors as two or three. Then, the prediction unit 120 may predict the amount of power consumption of each preliminary processor.

For example, a processor may consume a power of 0.02 watt per second. If two processors are used, the prediction unit 120 may predict the amount of power consumption as 2×24 s×0.02 watt/s=0.96 watts (W) (final amount of power consumption). In an example of three processors, the prediction unit 120 may predict the amount of final power consumption as 3×17 s×0.02 watt/s=1.02 watts (W) (final amount of power consumption). If the user requirement is minimum consumption of power, the determination unit 130 may determine the final number of processors as two, since the two processors consume the minimum power, e.g., 0.96 watts (W) in the above example.

The allocation unit 140 may allocate data to be processed to the determined number of processors from among the multiple processors 150, 151, and 152. In one example, the allocation unit 140 may allocate the data to the processors in such a manner that the processors can process the data in parallel. For example, in response to the two processors 150 and 151 being determined to process the data, the allocation unit 140 may allocate the data to be processed to the two processors 150 and 151.

The data processing apparatus 100 may allocate the data to the processors to enable the processors to process the data efficiently. Moreover, the data processing apparatus 100 may operate the smallest number of processors, reducing power consumption compared to operating all processors.

Figure 2:
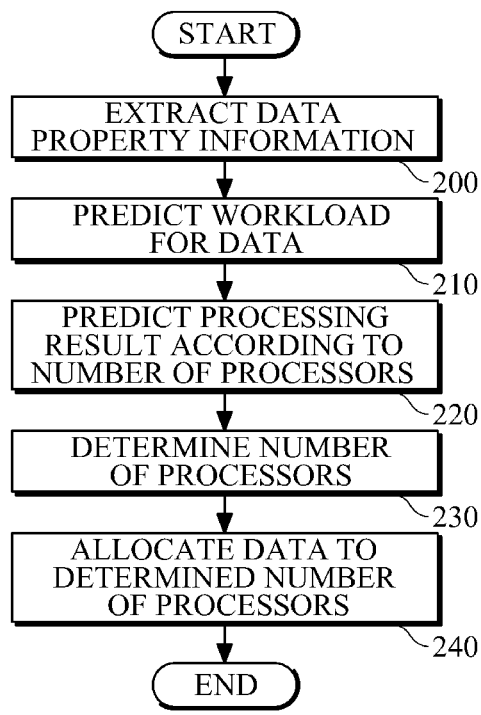
FIG. 2 is a flowchart of an example of a method of processing data.

FIG. 2 illustrates a flowchart of an example of a method of processing data.

Referring to the examples illustrated in FIGS. 1 and 2, in operation 200, the extraction unit 110 may extract data property information from a header of input data. The data property information may be data storage format information, data processing scheme information, and data type information. In operation 210, the prediction unit 120 may predict a workload of a processor to process the input data based on the extracted data property information. The workload may vary according to the data property information. In operation 220, the prediction unit 120 may predict a result of processing data based on the workload for the data according to is the number of processors. In operation 230, the determination unit 130 may determine the number of processors to process the data, using the predicted processing result. In operation 240, the allocation unit 140 may allocate the data to the determined number of processors. In one example, the allocation unit 140 may allocate the data to the processor such that the processor can process the data in parallel.

That is, in the data processing method described above, the workload may be allocated such that the processors can process the data efficiently.

Figure 3:
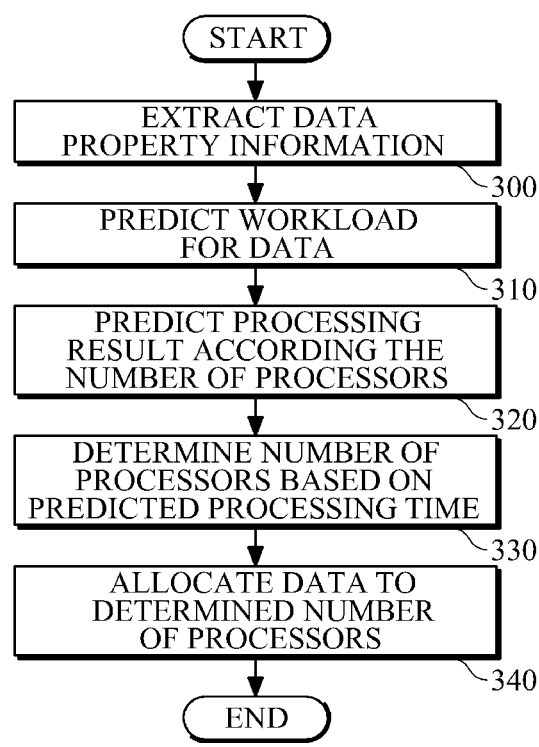
FIG. 3 is a flowchart of another example of a method of processing data.

FIG. 3 illustrates a flowchart of another example of a method of processing data. The method illustrated in FIG. 3 will be described in conjunction with FIG. 1.

In operation 300, the extraction unit 110 may extract data property information from a header from input data. The data property information may be data storage format information, data processing scheme information, and data type information. In operation 310, the prediction unit 120 may predict a workload of the processor for processing based on the extracted data property information. In operation 320, the prediction unit 120 may predict processing time according to the number of processors. In operation 330, the determination unit 130 may determine the number of processors to be allocated with the data based on the processing time. In one example, the determination unit 130 may determine the number of processors to be allocated with the data by comparing the processing time and a user requirement. The user requirement may be any condition that requires processing the data within, e.g., 30 or 40 seconds. In operation 340, the allocation unit 140 may allocate the data to the determined number of processors from among multiple processors.

As another example, the determination unit 130 may preliminarily determine the number of preliminary processors using the processing time included in the processing result, and then may finally determine the number of processors from among the preliminary processors using the amount of power consumption which is included in the processing result. That is, by using is the processing time, the determination unit 130 may determine the number of preliminary processors to be two, three, or four, and then by using the amount of power consumption, may finally determine the number of processors to be two.

In the method of processing data illustrated in FIG. 3 described above, the workload may be allocated to the processors such that the processors can process the data efficiently.

In addition, the method may run only the minimum number of processors, reducing power consumption as compared to when all processors are run.

Figure 4:
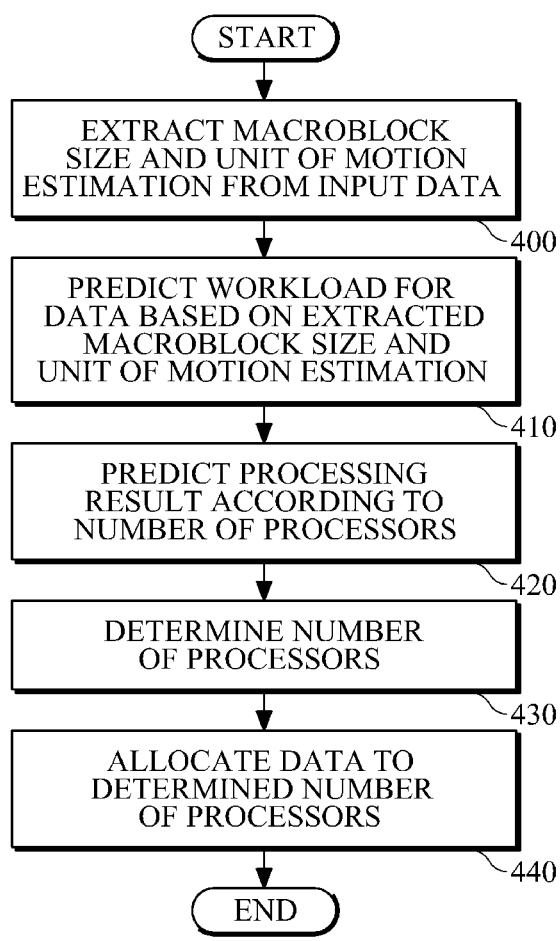
FIG. 4 is a flowchart of an example of a method of processing data.

FIG. 4 illustrates a flowchart of an example of a method of processing data. An example method of allocating data to a processor based on video codec [H 264] will be described. H.264/MPEG-4 Part 10 or AVC (Advanced Video Coding) is a block-oriented motion-compensation-based codec standard for video compression. In video codec H.264, various macroblock sizes, including 16×16, 8×8, 16×8, 4×8, and the like, may be used. As the macroblock size increases, a workload of a processor increases. Motion estimation may be performed in units of integer pixels, half pixels, or quarter pixels. As the unit of pixel decreases, the workload of the processor increases.

For example, if the macroblock size is 16×16 and the motion estimation is performed in units of integer pixels, the workload may be set, e.g., to "10". If the macroblock size is 16×8 and the motion estimation is performed in units of integer pixels, the workload may be set, e.g., to "5". In one example, the workload according to the macroblock size or the unit of the motion estimation may be set by a user.

In operation 400, the estimation unit 110 may extract information on macroblock size and a unit of motion estimation from the input data (stream). In operation 410, the prediction unit 120 may predict a workload for processing data based on the extracted macroblock size and the unit of motion estimation. For example, if the macroblock size is 16×16 and the motion estimation is performed in units of integer pixels, the prediction unit 120 may predict that the is workload is "10". In operation 420, the prediction unit 120 may predict a result of processing data based on the predicted workload for the data according to the number of processors. In operation 430, the determination unit 130 may determine the number of processors to be allocated with the data based on the predicted processing result. In operation 440, the allocation unit 140 may allocate the data to the determined number of processors according to the workload. At this time, the allocation unit 140 may allocate the data to the processors such that the processors may process the data in parallel.

As another example, the macroblock may be divided into sub-macroblocks of various sizes. In response to the macroblock size being 16×16, the sub-macroblock size being 8×8 and the motion estimation being performed in units of integer pixels, the workload may be set to "10". In response to the macroblock size being 16×16, the sub-macroblock size being 4×4 and the motion estimation being performed in units of integer pixels, the workload may be set to "20". In one example, the workload according to the macroblock size or the unit of motion estimation may be set by the user.

Using the above example with the FIG. 4 flowchart example, in operation 400, the extraction unit 110 may extract information on macroblock size, sub-macroblock size, and the unit of motion estimation from the input data (stream). In operation 410, the prediction unit 120 may predict a workload for processing the data based on the extracted information on macroblock size, sub-macroblock size and the unit of motion estimation. For example, in response to the macroblock size being 16×16, the sub-macroblock size being 8×8 and the motion estimation being performed in units of integer pixels, the prediction unit 120 may predict the workload as "10". For example, the macroblock may be divided into four sub-macroblocks. In operation 420, the prediction unit 120 may predicts a result of processing data based on the predicted workload according to the number of processors. In operation 430, the determination unit 130 may determine the number of processors to be allocated with the data based on the is predicted processing result. In operation 440, the allocation unit 140 may allocate the data to the determined number of processors according to the workload. At this time, the allocation unit 140 may allocate the data to the processors such that the processors may process the data in parallel.

As another example, the prediction unit 120 may predict the workload for the data on a macroblock-by-macroblock basis, or frame-by-frame basis. In an example of prediction of the workload on a macroblock-by-macroblock basis, the prediction unit 120 may predict the workload for each macroblock, and may predict a processing result with respect to the workload according to the number of processors. The determination unit 130 may determine the number of processors to be allocated with the data according to the prediction processing result. For example, the determination unit 130 may determine the number of processors to be allocated based on the processing times according to the number of processors. The allocation unit 140 may allocate the data to the determined number of processors.

Alternatively, in an example of prediction of the workload on a frame-by-frame basis, the prediction unit 120 may predict the workload for each frame, and may predict a processing result with respect to the predicted workload according to the number of processors. For example, the frame may be allocated to a plurality of macroblocks. The determination unit 130 may determine the number of processors to be allocated with the data based on the predicted result. For example, the determination unit 130 may determine the number of processors to be allocated with the data based on the processing times according to the number of processors. The allocation unit 140 may allocate the data to the determined number of processors. In one example, if delay occurs while a frame is processed in units of a macroblock, the allocation unit 140 may allocate the data to more processors. Accordingly, processing delay may be prevented. An example of a method of changing the number of processors by the allocation unit 140 in an example of the occurrence of processing delay may be described under a is presumption that a frame processing time is set to 10 seconds and three processors are allocated to process the data. If the delay occurs while a frame is processed in units of a macroblock, the allocation unit 140 may change the number of processors for processing the data to 4, and may allocate the data to four processors. Hence, the processing delay may be prevented.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the devices described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set top box, and the like, consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data processing apparatus comprising:
an interface configured to receive data;
a processor configured to process the received data;
a prediction unit configured to:
extract data property information from a header of the received data;

predict a workload for processing received data based on the extracted data property information;

receive a number N of processors in a group of processors capable of processing the received data, where N is greater than one;

create a series of N sets of processors, where each set of processors contains a different number of processors; and predict, based on the workload, a processing time required to process the received data by each set of processors in the series of sets; and a determination unit configured to determine a subset of the sets of processors in the series of sets to be allocated the data, by comparing the predicted processing time for each set of processors in the series of sets.

2. The data processing apparatus of claim 1, wherein the prediction unit is further configured to predict an amount of power consumption for each set of processors in the series of sets when processing the data.

3. The data processing apparatus of claim 2, wherein the determination unit is further configured to:

determine a number of preliminary sets of processors in the subset of sets of processors based on the predicted processing time of each set of processors; and determine a final set of processors from among the preliminary sets of processors, using the predicted amount of power consumption for each set of processors.

4. The data processing apparatus of claim 1, wherein the determination unit is further configured to determine the subset of the sets of processors to be allocated the data by comparing the predicted processing time of each set of processors to a user requirement.

5. The data processing apparatus of claim 1, further comprising an allocation unit configured to allocate the data to a determined set of processors in the subset of sets of processors so that the processors of the determined set are further configured to process the data in parallel.

6. The data processing apparatus of claim 1, wherein the data property information included in the header of the data comprises at least one of a data storage format, a data processing scheme, and a data type.

7. The data processing apparatus of claim 1, wherein the data property information comprises at least one of a macroblock size, a sub-macroblock size, and a unit of motion estimation; and the prediction unit is further configured to predict the workload for processing the data based on at least one of the macroblock size, the sub-macroblock size, and the unit of motion estimation.

8. The data processing apparatus of claim 1, wherein the determination unit is further configured to determine the subset of the sets of processors based on a user requirement to minimize power consumption.

9. The data processing apparatus of claim 1, wherein the processing times required by each set of processors are predicted by the prediction unit before the processing of the data by the processor.

10. A data processing method using at least one processor, the data processing method comprising:

receiving data;

extracting data property information from a header of the received data;

predicting a workload for processing the received data based on the extracted data property information;

receiving a number N of processors in a group of processors capable of processing the received data, where N is greater than one;

creating a series of N sets of processors, where each set of processors contains a different number of processors;

predicting, based on the workload, a processing time required to process the received data by each set of processors in the series of sets; and determining a subset of the sets of processors in the series of sets to be allocated the data by comparing the predicted processing time for each set of processors in the series of sets.

11. The data processing method of claim 10, wherein the predicting of the required processing time further comprises predicting an amount of power consumption for each set of processors in the series of sets when processing the data.

12. The data processing method of claim 11, wherein the determining a subset of the sets of processors comprises:

determining a number of preliminary sets of processors in the subset of sets of processors based on the predicted processing time of each set of processors; and determining a final set of processors from among the preliminary sets of processors, using the predicted amount of power consumption for each set of processors.

13. The data processing method of claim 10, wherein the determining of the subset of the sets of processors to be allocated the data comprises determining the subset of the sets of processors by comparing the predicted processing time of each set of processors to a user requirement.

14. The data processing method of claim 10, further comprising allocating the data to a determined set of processors in the subset of sets of processors so that the processors of the determined set process the data in parallel.

15. The data processing method of claim 10, wherein the data property information included in the header of the data comprises at least one of a data storage format, a data processing scheme, and a data type.

16. The data processing method of claim 10, wherein the data property information comprises at least one of a macroblock size, a sub-macroblock size, and a unit of motion estimation; and the method further comprises predicting the workload for processing the data based on at least one of the macroblock size, the sub-macroblock size, and the unit of motion estimation.

17. A non-transitory computer-readable information storage medium storing instructions for causing a computer to perform the data processing method of claim 10.

18. A data processing apparatus comprising:

a prediction unit configured to:

predict a workload required to process received data;

predict, based on the workload, a first processing time required to process the data by a first number of processors; and predict, based on the workload, a second processing time required to process the data by a second number of processors, the second number of processors being different from the first number of processors; and a determination unit configured to:

compare the first processing time with the second processing time; and determine whether to process the data by the first number of processors or the second number of processors based on a result of the comparing;

wherein either one or both of the prediction unit and the determination unit are implemented by at least one processor.

* * * * *